United States Patent Office 3,316,935
Patented May 2, 1967

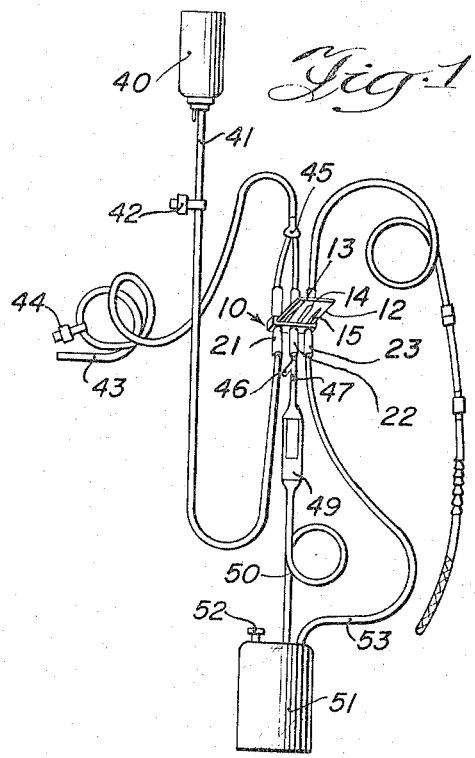
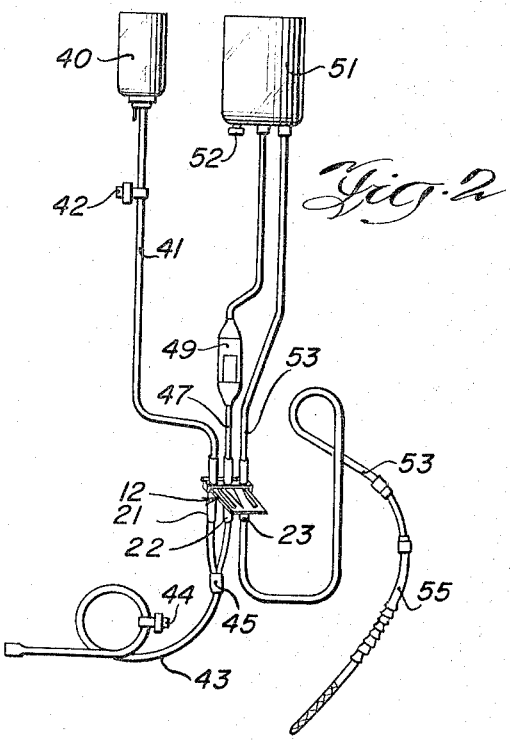
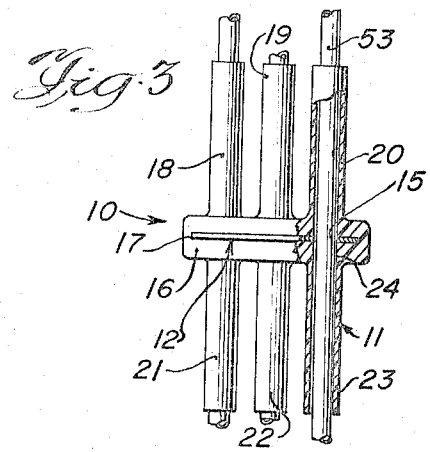
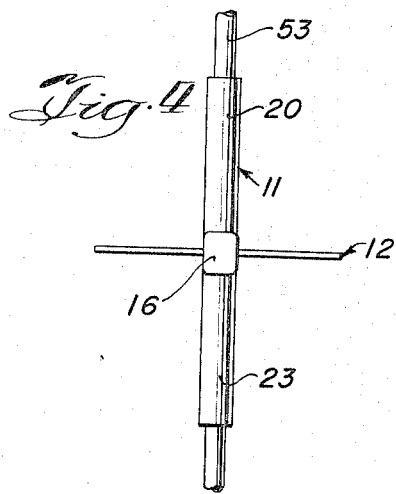
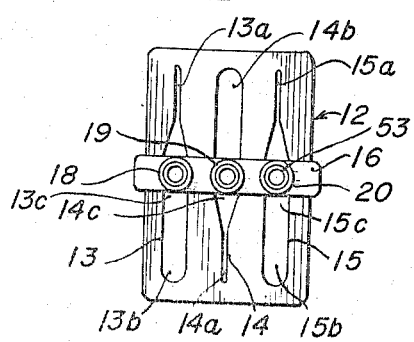
INVENTORS.
George C. Kaiser
Robert D. King
Henry M. Scislowicz

---

3,316,935
FLOW CONTROL CLAMP
George C. Kaiser, Webster Groves, Mo., Robert D. King, Indianapolis, Ind., and Henry M. Scislowicz, Lake Bluff, Ill., assignors to Abbott Laboratories, Chicago, Ill., a corporation of Illinois
Filed June 24, 1964, Ser. No. 377,585
5 Claims. (Cl. 137—595)

This invention relates to a flow control clamp useful in connection with a plurality of compressible tubes for alternately simultaneously compressing and releasing the walls thereof to alternatively obstruct and permit fluid flow through said plurality of tubes in a predetermined manner.

In the medical arts, there are numerous instances in which a plurality of tubings are used to supply various parenteral fluids to a patient. Conventionally, each of these tubings has independent flow control means for the purpose of adjusting the degree of compression of the tubing to block or permit fluid flow therethrough. An example of an apparatus in which sequential flow through separate fluid conduits from separate sources is utilized is a secondary administration system. It is, obviously, cumbersome and time-consuming to independently adjust flow through each of a plurality of conduits. Furthermore, the fewer the number of steps in the handling of a set-up of medical equipment, the smaller the opportunity for error in the use thereof by a nurse, and consequently, the smaller the chance of harming or even killing a patient because of misuse of medical equipment.

The instant invention overcomes the aforementioned deficiencies of the prior art by providing a single flow control clamp assembly wherein flow through a plurality of pieces of tubing or conduits can be controlled by a single sliding manipulation of the slide clamp of the apparatus. The apparatus comprises such a slide clamp having a plurality of elongated tapered apertures therein, each such aperture adapted to receive a piece of administration tubing and in one position to permit flow through such tubing and in a second position to obstruct flow through the tubing by pinching the tubing. The slide clamp is slidably mounted in a tube holder housing assembly comprising a body portion having a transverse slit adapted to slidably house the slide clamp, and tube holders extending from and depending from the body of the tube holder assembly to support each piece of administration tubing which passes through a corresponding clamp aperture in the slide clamp body and to facilitate operation and handling of the slide clamp assembly. The clamp apertures may be oppositely disposed to provide three positions of operation of the clamp; a first position wherein some of the tubes are closed off and others are open, an intermediate position where all tubes are open, and a third position where the tubes which are closed in the first position are opened and those which are open in the first position are closed.

It is therefore an object of this invention to provide a unitary slide clamp assembly for simultaneously operating on a plurality of compressible tubes to control flow therethrough.

It is a further object of this invention to provide a slide clamp assembly providing three positions of operation for a plurality of tubes.

Yet another object of this invention is to provide a three-way slide clamp for a plurality of tubes which is simple to operate and economical to manufacture.

A concomitant object of this invention is to provide a novel slide clamp assembly for use in an ascitic fluid infusion set and having a first position wherein fluid flow through two of three tubes is permitted, and flow through the third tube is obstructed, an intermediate position wherein fluid flow through three tubes is permitted, and a third position wherein flow through said third tube is permitted while flow through said other two tubes is obstructed.

Further objects and advantages of the present invention will become apparent from the following detailed description of the invention, reference being had to the accompanying illustrative drawings wherein:

FIGURE 1 is a diagrammatic representation of an ascitic fluid administration system including the slide clamp of the instant invention in a position wherein flow through two tubes is permitted and flow through a third tube is obstructed;

FIGURE 2 is a diagrammatic representation of the ascitic fluid infusion system of FIGURE 1 wherein the slide clamp assembly is in a position to permit fluid flow through said one tube and obstruct fluid flow through said two tubes;

FIGURE 3 is a front elevation, partly in section, of a preferred embodiment of the slide clamp assembly of the instant invention;

FIGURE 4 is a side elevation view of the slide clamp assembly of FIGURE 3;

FIGURE 5 is a top plan view of the slide clamp assembly of FIGURE 3.

Referring now to FIGURE 3, there is shown a slide clamp assembly generally designated at 10, including a tube holder member or housing 11 and a slide clamp 12. The tube holder member 11 comprises an elongated, substantially rectangular body member 16 having three integral upstanding tube holders 18, 19 and 20, and three integral depending tube holders 21, 22 and 23. Each of the tube holders comprises a tubular member approximately one and one half inches in length and having a circular bore extending therethrough. Each of the tube holders 18, 19 and 20 is in axial vertical alignment with its corresponding tube holders 21, 22 and 23 and the bores of each aligned pair of tube holders are connected by corresponding bores 24 in body member 16. A transverse aperture or slot 17 extends through the center of body member 16 and is adapted to slidably engage rectangular slide clamp member 12.

Side clamp member 12 is constructed of sheet aluminum having three punched-out slots or clamp apertures 13, 14 and 15. As best seen in FIGURE 5, each of the slots 13, 14 and 15 has a broad uniform end portion, respectively labeled 13b, 14b and 15b, the length of which is slightly more than one half of the total length of the slot. Each of the broad slot portions 13b, 14b and 15b extends to a narrow, slightly tapered wedge portion, respectively designated as 13a, 14a and 15a. Each of the broad slots sections 13b, 14b and 15b is slightly larger than the outside diameter of the administration tubing in its transverse dimension so as to accommodate a piece of parenteral administration tubing of conventional size in a substantially unstressed condition. Conventional administration tubing has a .170 inch O.D. Each of the wedge-type narrow end slot sections 13a, 14a and 15a is sufficiently narrow to compress a piece of conventional parenteral administration tubing sufficiently to obstruct any fluid flow therethrough. If .170 inch O.D. tubing is used the width of the narrow slot sections should be about .025 inch. Slide apertures 13 and 15 have their wide sections 13b and 15b at the proximal end of the slide clamp, and slide aperture 14 has its wide end section at the distal end of the slide clamp. The aligned center portions 13c, 14c and 15c of the respective clamp apertures are substantially equal in width to the diameter of the tubing, so that when tubing in the respective slots is in the center portion, none of the tubes are significantly compressed by the walls of the clamp apertures.

In use, slide clamp 12 is placed in slot 17 of body member 16 such that the central longitudinal portions 13c, 14c and 15c of the slide apertures are in alignment with the bores of the corresponding tube holders.

As previously mentioned, slide clamp member 12 is formed of sheet aluminum from which slide apertures 13, 14 and 15 have been stamped out, the slide clamp being sequentially tumbled to smooth out any rough edges of apertures 13, 14 and 15 to prevent accidental severing of administration tubing when the slide clamp is in use. Tube holder member 11 is a unitary molded piece made of high density polyethylene. Other rigid plastics or other materials are also suitable for this purpose. The slide clamp member may be formed of plastic or other metal in lieu of the aluminum suggested.

In setting up the slide clamp for use, the slide clamp is placed in the position shown in FIGURE 5 and a length of administration tubing is threaded through each pair of tube holders.

In the ascitic fluid infusion system illustrated in FIGURES 1 and 2, lengths of administration tubing 41, 47 and 53 are seen as threaded through the corresponding pairs of tube holders 18 and 21, 19 and 22, and 20 and 23, and the corresponding slide clamp apertures 13, 14 and 15.

The ascitic fluid infusion apparatus comprises a conventional parenteral fluid container 40 which contains a 5% solution of dextrose in water. A length of administration tubing 41 communicates the solution container 40 with one branch of a Y-type connector 45, and extends through tube holders 18 and 21 and slide aperture 13. The other branch of Y-type connector 45 is attached to a length of administration tubing 47 which passes through tube holders 19 and 22, and slide aperture 14 to connect to one end of a filter chamber 49. The other end of filter chamber 49 is connected by a length of administration tubing 50 to a collapsible plastic parenteral fluid container 51. A length of tubing 53 communicates at one end with the collapsible parenteral fluid container 51, passes through tube holder 20 and 23 and slide aperture 15 and is connected at its distal end to a peritoneal catheter 55. The bottom stem of Y-type connector 45 is attached to one end of a length of administration tubing 43, and the other end of length of administration tubing 43 is attached to the hub of a hypodermic needle (not shown). A screw clamp is mounted on length of tubing 43 to adjust flow through the hypodermic needle into the vein of a patient. Another screw clamp 42 mounted on length of tubing 41 is used to adjust flow of the dextrose solution from bottle 40.

In operation, the slide clamp is initially placed in the position shown in FIGURE 1 wherein tube 47 is pinched closed by slide aperture 14 and tubes 41 and 53 are open. First, pinch clamp 42 is opened to allow dextrose solution to flow through tubing 41 into tubing 43, to clear air out of tubes 41 and 43, to prevent air embolism when the hypodermic needle is injected into the vein of a patient. Screw clamp 42 is then closed to stop flow from solution bottle 40 into the slide clamp which is moved to the neutral position shown in FIGURE 5 wherein flow through tubes 41, 47 and 53 is enabled.

The peritoneal catheter is then inserted in the peritoneal cavity and ascitic fluid is withdrawn from the peritoneal cavity, and collects in bag 51, forcing air out of tubing 53, bag 51, tubing 50, 47 and 43. When air is substantially out of the system, the slide clamp is slid to the position shown in FIGURE 2 wherein lengths of tubing 41 and 53 are pinched closed and flow is only permitted through tube 47.

With the hypodermic needle placed in the vein of the patient, ascitic fluid passes from bag 51 through filter 49, wherein it is filtered, and is reinjected into the patient's system through the hypodermic needle in the vein of the patient. When bag 51 of ascitic fluid is substantially exhausted, the slide clamp is slid back to the position shown in FIGURE 1 and bag 51 is lowered so that ascitic fluid flowing through tube 53 is collected in the bag. Screw clamp 42 is then opened up to permit dextrose solution to flow through length of tubing 43 into the vein of the patient. This procedure is continued for as long as seven days until no more acitic fluid can be drained from the patient.

In the event that filter 49 becomes clogged so that ascitic fluid cannot be reintroduced into the patient's system, port 52 enables one end of a secondary administration set containing a filter to be connected to the bag 51 of the ascitic fluid. The secondary administration set (not shown) can contain a filter similar to filter 49 and can be connected into the tubing segment 47 below filter 49 by means of a Y-type reseal infusion site 46 or other similar means to enable ascitic fluid to flow from bag 51 into tubing 47, while by-passing filter 49.

Although the invention has been illustrated with respect to an ascitic fluid infusion apparatus requiring three tubes, it is apparent that the principles of the invention can be applied to an infusion system having other numbers of tubes. Furthermore, whereas in the instant case one of the slide apertures, i.e., aperture 15 is oppositely disposed from apertures 13 and 14 and is located between said apertures 14 and 15, the relative directions of the apertures would be dependent upon the particular infusion system for which the slide clamp assembly of this invention is to be used. Moreover, the tube holders need not be discrete members as shown but can comprise apertures in a single block of material.

The size of slot 17 is slightly larger than the thickness of slide clamp 12 so that a sliding fit is obtained, whereby the slide clamp can be maintained in a fixed position but can easily be adjusted. The bores in the tube holders 18, 19, 20, 21, 22 and 23 are of slightly larger inside diameter than the diameter of the various lengths of administration tubing whereby the lengths of administration tubing are loosely, adjustably supported by the tube holders, thus facilitating operation of the slide clamp. The slide clamp is operated by placing the fingers about the tube holder and pushing the slide clamp with either the thumb or the middle finger, depending upon the desired direction of the movement of the slide clamp. In the event that the use of tubing lengths of different diameters is desired, the corresponding apertures may be dimensionally varied in accordance with the standards of fit described above.

Others may readily adapt the invention for use under various conditions of service, by employing one or more of the novel features disclosed or equivalent thereof, without departing from the spirit and scope of the invention, as claimed in the appended claims.

What is claimed:

1. A flow control clamp for use with a parenteral administration system having a plurality of lengths of administration tubing, comprising: a thin, elongated slide clamp defining a plurality of transversely spaced clamp apertures in side-by-side relationship, each such aperture having a wide end portion the width of which is approximately equal to the diameter of said administration tubing and the length of which is slightly greater than one half of the total length of said aperture, so that an intermediate position of the clamp is provided wherein at least two of the lengths of tubing are open, and a narrow end portion the width of which is substantially less than the diameter of said tubing, so that said tubing will be restricted when positioned in said narrow end portion to reduce any fluid flow therethrough, at least one of said apertures being oppositely disposed with respect to the other of said apertures, whereby the wide end portion of one of said apertures is adjacent to the narrow end portion of another of said apertures, and a body member defining a transverse slot of approximately the same width and thickness as said slide clamp and slidably accommodating said slide clamp and defining a plurality of apertures of approximately the same diameter as said tubing and in respective alignment with a corresponding slide clamp aperture.

2. Apparatus as set forth in claim 1 including a pair of oppositely disposed, angularly aligned tube holding members integral with said body member, corresponding to each aperture in said body member and in alignment therewith.

3. A parenteral administration system comprising a plurality of flexible compressible administration conduits, an elongated slide clamp defining a transversely spaced, longitudinally extending clamp aperture corresponding to each conduit, each clamp aperture having a wide end portion of approximately the same width as the corresponding conduit and an opposite end portion of substantially less width whereby compression of one of said conduits by the corresponding opposite end portion blocks fluid flow therethrough, the length of said wide end portion being slightly greater than one half the length of said aperture so that an intermediate position of the clamp is provided wherein at least two of the lengths of conduit are open, at least one of said apertures being oppositely disposed with respect to the other of said apertures, said apertures being in side-by-side relationship whereby the wide end portion of one of said apertures is adjacent to the opposite end portion of another of said apertures, and a clamp housing having opposite ends and defining a centrally located transversely extending slot slidably accommodating said slide clamp and respective extending passages between said housing ends aligned with each of said clamp apertures and respectively accommodating one of said conduits.

4. A parenteral administration system comprising at least three flexible, compressible administration conduits, an elongated slide clamp defining three transversely spaced longitudinally extending clamp apertures in side-by-side relationship, each clamp aperture having a wide end portion of approximately the same width as said conduits and an opposite end portion of substantially less width than said conduits so that said conduits will be restricted when positioned in said opposite end portion to obstruct any fluid flow therethrough, the length of said wide end portion being slightly greater than one half the length of said aperture, so that an intermediate position of the clamp is provided wherein at least three of the lengths of conduit are open, at least one of said apertures being oppositely disposed with respect to at least two of the others of said apertures, whereby the wide end portion of said at least one aperture is adjacent to the opposite end portion of said at least two of the others of said apertures, and a clamp housing comprising a body section defining a transverse slot slidably accommodating said slide clamp and apertures extending through the housing aligned with each clamp aperture and accommodating one of said administration conduits and a pair of oppositely extending conduit holders integral with said housing and aligned with each housing aperture encompassingly supporting the corresponding administration conduit.

5. Apparatus as set forth in claim 4 wherein said housing is formed of substantially rigid plastic, and said slide clamp is formed of sheet aluminum.

References Cited by the Examiner

UNITED STATES PATENTS

| | | | |
|---|---|---|---|
| 575,696 | 1/1897 | Burns. | |
| 720,450 | 2/1903 | Luellen et al. | |
| 839,610 | 12/1906 | Lusso | 24—222 |
| 1,225,710 | 5/1917 | Herschede | 24—222 |
| 2,092,400 | 9/1937 | Miller | 251—7 XR |
| 2,548,993 | 4/1951 | Mierzwa | 24—222 |
| 2,645,245 | 7/1953 | Maisch | 251—7 XR |
| 2,889,848 | 6/1959 | Redmer | 251—7 XR |
| 3,075,551 | 1/1963 | Smith et al. | 137—609 |

M. CARY NELSON, *Primary Examiner.*

HENRY T. KLINKSIEK, *Assistant Examiner.*